United States Patent
Grisey et al.

(10) Patent No.: US 12,401,967 B2
(45) Date of Patent: Aug. 26, 2025

(54) METHOD FOR MANAGING TRANSMISSIONS OF DETECTION SIGNALS BY A VEHICLE

(71) Applicant: Continental Automotive Technologies GmbH, Hannover (DE)

(72) Inventors: Christophe Grisey, Toulouse (FR); Sébastien Lavin, Toulouse (FR)

(73) Assignee: Continental Automotive Technologies GmbH, Hannover (DE)

(*) Notice: Subject to any disclaimer, the term of this patent is extended or adjusted under 35 U.S.C. 154(b) by 73 days.

(21) Appl. No.: 18/571,800

(22) PCT Filed: Jun. 29, 2022

(86) PCT No.: PCT/EP2022/067926
§ 371 (c)(1),
(2) Date: Dec. 19, 2023

(87) PCT Pub. No.: WO2023/275159
PCT Pub. Date: Jan. 5, 2023

(65) Prior Publication Data
US 2024/0334156 A1    Oct. 3, 2024

(30) Foreign Application Priority Data

Jun. 30, 2021  (FR) ..................... 2107115

(51) Int. Cl.
*H04W 4/021* (2018.01)
*H04W 4/40* (2018.01)
(52) U.S. Cl.
CPC ............. *H04W 4/022* (2013.01); *H04W 4/40* (2018.02)

(58) Field of Classification Search
CPC ......... H04W 4/022; H04W 4/40; H04W 4/48; H04W 4/80; H04W 4/029; H04W 4/021
See application file for complete search history.

(56) References Cited

U.S. PATENT DOCUMENTS 10,894,528 B2 * 1/2021 Kim ..................... H04W 4/021
2008/0214202 A1  9/2008 Toomey
(Continued)

OTHER PUBLICATIONS

International Search Report and Written Opinion for International Application No. PCT/EP2022/067926, mailed Sep. 30, 2022, 16 pages.
(Continued)

*Primary Examiner* — An T Nguyen
(74) *Attorney, Agent, or Firm* — Buchanan Ingersoll & Rooney PC

(57) ABSTRACT

A method for managing transmissions, by a motor vehicle, of signals for detecting a device of a user over a wireless communication link. The method includes the steps of requesting activation, by the user of the vehicle, of a so-called "silent" mode in which the transmission of detection signals by the vehicle over the wireless communication link is suspended, it being possible for communication signals generated by a physical entity other than the vehicle to be received by the vehicle, following the activation request, detecting the device of a user outside a predetermined area around the vehicle, activating the silent mode by the vehicle when the device of a user is detected outside the predetermined area, sending to the vehicle, by the user, a signal to deactivate the silent mode from the device so as to reauthorize the transmission of detection signals by the vehicle over the wireless communication link.

9 Claims, 1 Drawing Sheet

(56) References Cited

U.S. PATENT DOCUMENTS

| | | | |
|---|---|---|---|
| 2011/0136476 A1* | 6/2011 | Beasley | H04M 1/72463 |
| | | | 455/414.1 |
| 2020/0186970 A1* | 6/2020 | Dekovich | H04W 4/40 |
| 2020/0245111 A1* | 7/2020 | Heininger | H04W 4/40 |
| 2020/0377056 A1 | 12/2020 | Grisey et al. | |
| 2021/0026347 A1* | 1/2021 | Nakashima | G05D 1/224 |
| 2021/0311493 A1* | 10/2021 | Fujiyama | G07C 9/00309 |

OTHER PUBLICATIONS

International Search Report and Written Opinion for International Application No. PCT/EP2022/067926, mailed Sep. 30, 2022, 14 pages (French).

French Search Report for French Application No. 2107115, dated Feb. 9, 2022 with translation, 12 pages.

* cited by examiner

METHOD FOR MANAGING TRANSMISSIONS OF DETECTION SIGNALS BY A VEHICLE

CROSS REFERENCE TO RELATED APPLICATIONS

This application is the U.S. National Phase Application of PCT International Application No. PCT/EP2022/067926, filed Jun. 29, 2022, which claims priority to French Patent Application No. 2107115, filed Jun. 30, 2021, the contents of such applications being incorporated by reference herein.

FIELD OF THE INVENTION

The present invention relates to the automotive field and relates more particularly to a method for managing transmissions of detection signals by a motor vehicle.

BACKGROUND OF THE INVENTION

Nowadays, many motor vehicles comprise a passive access system able to unlock the opening panels of the vehicle simply by approaching said vehicle with a badge. In a known manner, the vehicle periodically transmits a detection signal which, when it is received by the badge, causes an exchange of communication signals between the badge and the vehicle in order to authenticate the badge and unlock the opening panels. The transmission of the detection signal is carried out in the low-frequency radio band (LF) in order to limit the energy required for said transmission, whereas the exchanges of communication signals between the vehicle and the badge are carried out in the radiofrequency radio band (RF) in order to authenticate said badge.

However, the periodic transmission of detection signals until the vehicle user arrives leads to a large consumption of electrical energy, in particular when the vehicle is parked for a long period, for example over several days. In addition, these detection signals can be used in order to hack the vehicle in order to unlock the access points thereof.

There is therefore a need for a simple and effective solution in order to at least partially overcome these disadvantages.

SUMMARY OF THE INVENTION

For this purpose, the first aspect of the invention is a method for managing transmissions, by a motor vehicle, of signals for detecting a user device over a wireless communication link, said method comprising the steps of:
  requesting activation, by the user of the vehicle, of a so-called "silent" mode in which the transmission of detection signals by the vehicle over the wireless communication link is suspended, it being possible for communication signals generated by a physical entity other than the vehicle to be received by said vehicle,
  following the activation request, detecting the user device outside a predetermined area around the vehicle,
  activating said silent mode by the vehicle when the user device has been detected outside the predetermined area,
  sending to the vehicle, by the user, a signal to deactivate the silent mode from the user device so as to reauthorize the transmission of detection signals by the vehicle over the wireless communication link.

The method according to an aspect of the invention makes it possible to manage the transmission of signals by the vehicle when the user is far from said vehicle, in a simple, quick and efficient manner. The method thus advantageously makes it possible to save electrical energy of the vehicle when the user is far from the vehicle, in particular when the user leaves his vehicle in a long-term parking lot.

The wireless communication link is preferably of the LF type.

Alternatively, the wireless communication link is of the BLE, Wi-Fi, Li-Fi, UWB or RAN type, or any other suitable type.

The activation request can be produced automatically via the user device or any other suitable device, or else manually by the user.

In an embodiment, the activation request is produced by the user from inside the vehicle.

Advantageously, the activation request is produced by the user from inside the vehicle by pressing a button or via a touch screen.

Alternatively, the activation request is produced by the user from inside the vehicle via the user device.

In another embodiment, the activation request is produced by the user from outside the vehicle via the user device.

Advantageously, the activation of the silent mode by the vehicle is carried out when the user device has been detected outside the predetermined area at the end of a predetermined period.

According to one aspect of the invention, the user device is an electronic key, a badge or a smartphone.

According to another aspect of the invention, the signal for deactivating the silent mode is sent over a second wireless communication link or else is generated following the activation of a button of the vehicle.

The second wireless communication link is of the RF type. Alternatively, the wireless communication link is of the BLE, Wi-Fi, Li-Fi, UWB or RAN type, or any other suitable type.

An aspect of the invention also relates to a computer program product characterized in that it contains a set of program code instructions that, when they are executed by one or more processors, configure the one or more processors to implement a method as set out above.

An aspect of the invention also relates to an electronic control module for a motor vehicle, said electronic control module being configured for:
  receiving an activation request, produced by the user of the vehicle, of a so-called "silent" mode in which the transmission of detection signals by the vehicle over the wireless communication link is suspended, it being possible for communication signals generated by a physical entity other than the vehicle to be received by said vehicle,
  following the activation request, detecting the user device outside a predetermined area around the vehicle,
  activating said silent mode, by the vehicle, when the user device has been detected outside the predetermined area,
  receiving a signal for deactivating the silent mode, sent by the user from the user device,
  reauthorizing the transmission of detection signals by the vehicle over the wireless communication link when the deactivation signal has been received.

An aspect of the invention also relates to a method, implemented by an electronic control module as previously described, comprising the steps of:
  receiving an activation request, produced by the user of the vehicle, of a so-called "silent" mode in which the transmission of detection signals by the vehicle over the wireless communication link is suspended, it being possible for communication signals generated by a physical entity other than the vehicle to be received by said vehicle, following the activation request, detecting the user device outside a predetermined area around the vehicle, activating said silent mode, by the vehicle, when the user device has been detected outside the predetermined area, receiving a signal for deactivating the silent mode, sent by the user from the user device, reauthorizing the transmission of communication signals by the vehicle over the wireless communication link when the deactivation signal has been received.

An aspect of the invention also relates to a computer program product characterized in that it contains a set of program code instructions that, when they are executed by one or more processors, configure the one or more processors to implement a method as set out above.

An aspect of the invention also relates to a motor vehicle comprising an electronic control module as described above.

BRIEF DESCRIPTION OF THE DRAWINGS

Other features and advantages of aspects of the invention will become more apparent upon reading the description that follows. This description is purely illustrative and should be read with reference to the appended drawings, in which.

DETAILED DESCRIPTION OF THE PREFERRED EMBODIMENTS

Figure 1:
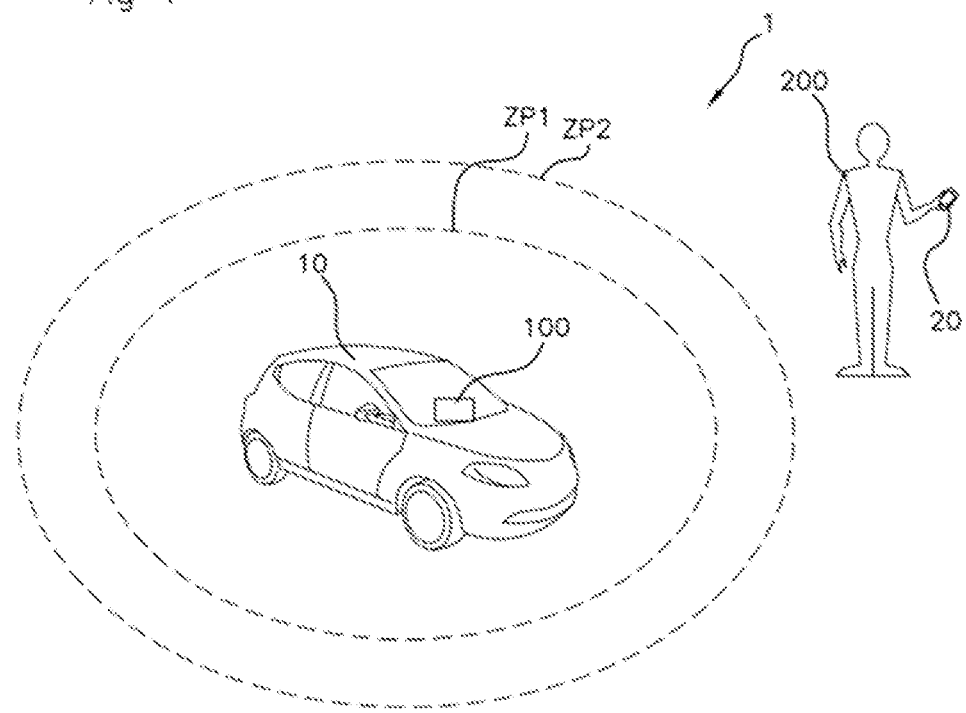
FIG. 1 schematically shows an embodiment of the system according to the invention.
Figure 2:
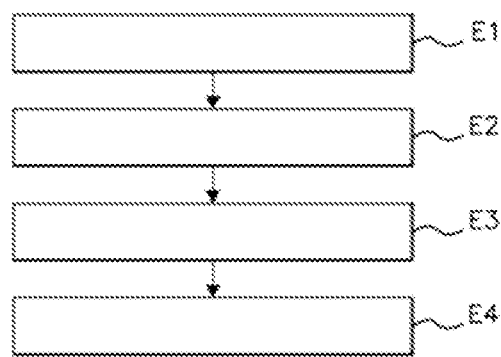
FIG. 2 schematically shows an embodiment of the method according to the invention.

FIG. 1 schematically shows an example of a system 1 according to an aspect of the invention.

The system 1 comprises a vehicle 10 and a device 20 carried by a user 200.

Vehicle 10

The vehicle 10 comprises an electronic control module 100.

The electronic control module 100 is configured to transmit a detection signal to the device 20 of a user 200 over a first wireless communication link.

The first wireless communication link preferably uses the low-frequency radio band (LF). In other words, the first wireless communication link is of the LF type. Alternatively, the first wireless communication link could be of the BLE, Wi-Fi, Li-Fi, UWB or RAN type, or any other suitable type.

The electronic control module 100 is configured to receive an activation request, produced by the user of the vehicle 10, of a so-called "silent" mode, wherein the transmission of detection signals by the vehicle 10 over the first wireless communication link is suspended.

In this silent mode, communication signals generated by a physical entity other than the vehicle 10 can be received by said vehicle 10, over the first communication link or over a second communication link.

The electronic control module 100 is configured for detecting, following an activation request of the silent mode, the device 20 of a user 200 outside a first predetermined area ZP1 around the vehicle 10.

The electronic control module 100 is configured to activate the silent mode when the device 20 has been detected outside the first predetermined area ZP1.

The electronic control module 100 is configured to receive a signal for deactivating the silent mode, sent by the user from the device 20.

The electronic control module 100 is configured to reauthorize the transmission of detection signals by the vehicle 10 over the first wireless communication link when a deactivation signal has been received.

The electronic control module 100 comprises a processor capable of implementing a set of instructions enabling these functions to be carried out.

Device 20

The device 20 is configured for receiving detection signals transmitted by the electronic control module 100 over a first wireless communication link and for communicating with the electronic control module 100 over a second wireless communication link.

In a preferred embodiment, the first wireless communication link is of the LF type and the second wireless communication link is of the RF type. It will be noted however that, in another embodiment, the first wireless communication link and the second wireless communication link could be the same type, or even coincident.

Implementation

First, in a step E1, the user requests the activation of the silent mode MS. This request may be produced via a button or a touch screen inside the vehicle 10 or else via the device 20. A confirmation may be requested from the user.

Following the activation request, the electronic control module 100 detects the device 20 outside the first predetermined area ZP1 around the vehicle 10, for example when it leaves said first predetermined area ZP1, in a step E2.

Then, in a step E3, the electronic control module 100 activates the silent mode MS when the device 20 has been detected outside the first predetermined area ZP1 and, advantageously, at the end of a predetermined period. This predetermined period can advantageously be set by the user beforehand, for example via a touch-sensitive interface of the vehicle 10.

At this time, the vehicle 10 transmits no more detection signals, which makes it possible on the one hand to save electrical energy and, on the other hand, can remove the risk of hacking of the vehicle 10 via the detection signal.

When the user returns to the vehicle, in particular enters a second predetermined area ZP2 around the vehicle, the device 20 transmits, on request from the user or else automatically, a signal SDES for deactivating the silent mode, to the electronic control module 100, for example over an RF (radiofrequency) communication link, so as to reauthorize the transmission of detection signals by the vehicle 10 over the first wireless communication link in a step E4. In a preferred example, the first predetermined area ZP1 corresponds to an area of coverage of an LF signal over the first communication link and the second predetermined area ZP2 corresponds to an area of coverage of an RF signal over the second communication link. In this case, the first predetermined area ZP1 and the second predetermined area ZP2 are different. In another embodiment, the first predetermined area ZP1 and the second predetermined area ZP2 could be identical.

Use of the silent mode can preferably be configured by the user. For example, the user can configure the electronic control module 100 so that it does not use the silent mode, or else so that it only uses it after requesting confirmation and with confirmation, or else that it uses it after requesting confirmation and without confirmation.

In an embodiment, the activation of the silent mode at the end of a predetermined period allows the user to return to the vehicle before the silent mode is activated, in other words without this return yet being automatically detectable. This predetermined period counter can hence, for example, enable the user to return and search for a forgotten item in the vehicle, and to depart again without being detected so that the silent mode remains activated.

The invention can therefore advantageously save energy of the vehicle when the user is far from the vehicle and, in particular, for a significant duration, for example when he leaves his vehicle in an airport parking lot for a significantly long period.

The invention claimed is:

1. A method for managing transmissions, by a motor vehicle, of signals for detecting a device of a user over a wireless communication link, said method comprising:
   requesting activation, by the user of the vehicle, of a so-called "silent" mode in which the transmission of detection signals by the vehicle over the wireless communication link is suspended, it being possible for communication signals generated by a physical entity other than the vehicle to be received by said vehicle,
   following the activation request, detecting the device of a user outside a predetermined area around the vehicle,
   activating said silent mode by the vehicle when the device of a user has been detected outside the predetermined area, and
   sending to the vehicle, by the user, a signal to deactivate the silent mode from the user device so as to reauthorize the transmission of detection signals by the vehicle over the wireless communication link,
   wherein the activation request is produced by the user from inside the vehicle.

2. The method as claimed in claim 1, wherein the activation request is produced by the user from inside the vehicle by pressing a button or via a touch screen.

3. The method as claimed in claim 1, wherein the activation request is produced by the user from inside the vehicle via the device of a user.

4. The method as claimed in claim 1, wherein the activation request is produced by the user from outside the vehicle via the device of a user.

5. A method for managing transmissions, by a motor vehicle, of signals for detecting a device of a user over a wireless communication link, said method comprising:
   requesting activation, by the user of the vehicle, of a so-called "silent" mode in which the transmission of detection signals by the vehicle over the wireless communication link is suspended, it being possible for communication signals generated by a physical entity other than the vehicle to be received by said vehicle,
   following the activation request, detecting the device of a user outside a predetermined area around the vehicle,
   activating said silent mode by the vehicle when the device of a user has been detected outside the predetermined area, and
   sending to the vehicle, by the user, a signal to deactivate the silent mode from the user device so as to reauthorize the transmission of detection signals by the vehicle over the wireless communication link,
   wherein the activation of the silent mode by the vehicle is carried out when the device of a user has been detected outside the predetermined area and at the end of a predetermined duration.

6. The method as claimed in claim 1, wherein the device of a user is an electronic key, a badge or a smartphone.

7. The method as claimed in claim 1, wherein the signal for deactivating the silent mode is sent over a second wireless communication link or else is generated following the activation of a button of the vehicle.

8. An electronic control module for a motor vehicle, said electronic control module being configured for:
   receiving an activation request, produced by the user of the vehicle from inside the vehicle, of a so-called "silent" mode in which the transmission of detection signals by the vehicle over the wireless communication link is suspended, it being possible for communication signals generated by a physical entity other than the vehicle to be received by said vehicle,
   following the activation request, detecting the device of a user outside a predetermined area around the vehicle,
   activating said silent mode by the vehicle when the device of a user has been detected outside the predetermined area,
   receiving a signal for deactivating the silent mode, sent by the user from the device of a user, and
   reauthorizing the transmission of detection signals by the vehicle over the wireless communication link when the deactivation signal has been received.

9. A motor vehicle comprising an electronic control module as claimed in claim 8.

* * * * *